April 10, 1956   A. E. SCHWANEKE ET AL   2,741,682
AUTOMATIC COFFEE BREWER REGULATOR
Filed Aug. 5, 1954   3 Sheets-Sheet 1

INVENTORS:
ALFRED E. SCHWANEKE
FRED C. SCHWANEKE
BY
ATT'Y

April 10, 1956  A. E. SCHWANEKE ET AL  2,741,682
AUTOMATIC COFFEE BREWER REGULATOR
Filed Aug. 5, 1954  3 Sheets-Sheet 2

INVENTORS:
ALFRED E. SCHWANEKE
FRED C. SCHWANEKE
BY
ATT'Y

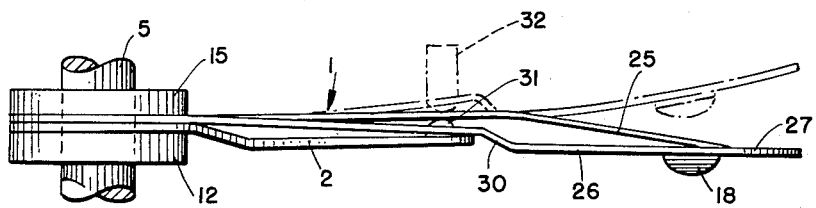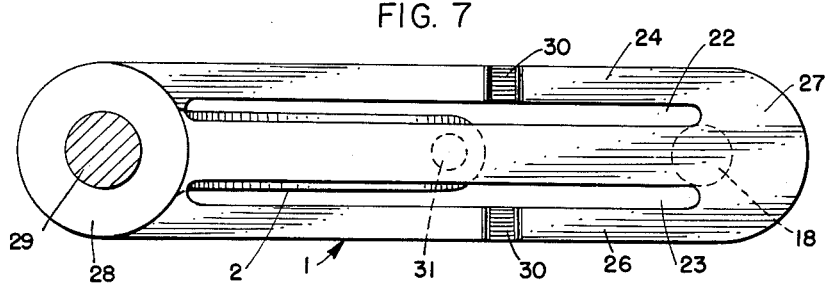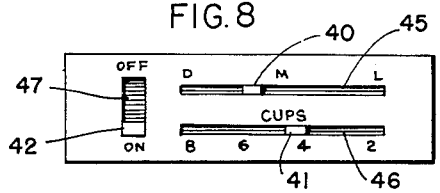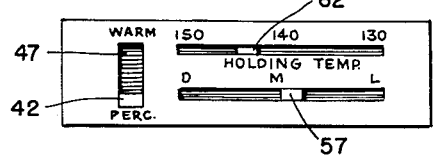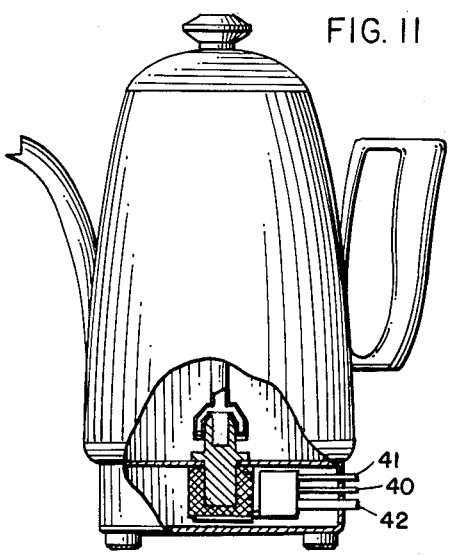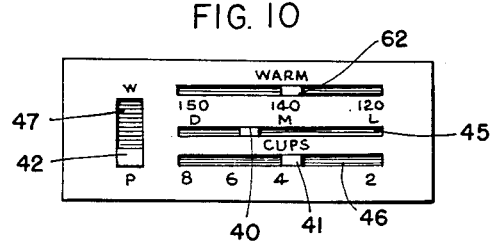
INVENTORS:
ALFRED E. SCHWANEKE
FRED C. SCHWANEKE
BY
ATT'Y

United States Patent Office 2,741,682
Patented Apr. 10, 1956

2,741,682
AUTOMATIC COFFEE BREWER REGULATOR

Alfred E. Schwaneke, Northbrook, and Fred C. Schwaneke, Chicago, Ill., assignors to A-M Corporation, Chicago, Ill., a corporation of Illinois Application August 5, 1954, Serial No. 448,003

18 Claims. (Cl. 200—138)

This invention relates to thermostatic regulators for electric beverage brewers and the like, such as are described in our copending application Serial No. 433,737, filed June 1, 1954, and particularly to thermostatic regulators of the snap-acting, manually reset type which function primarily to open an electric heater circuit upon the attainment of a predetermined temperature condition in the body being heated.

The main objects of this invention are to provide an improved snap-acting, thermostatically actuated switch for electrically heated devices; to provide an improved thermostatic switch construction and assembly; to provide an improved snap-acting, manually adjustable thermostatically actuated circuit breaker for electric heating circuits; to provide such a device having improved adjustment means for regulating the temperature at which circuit opening operation occurs; and to provide such a device having dual, independently operable temperature regulating means, each arranged to modify the operative setting of the other according to its own scale of operating conditions, and both acting in unison to control the operation of a single circuit breaker according to the sum of their individual adjustments.

Other objects of this invention are to provide an improved temperature regulator for performing the dual functions of manual-reset circuit interruption and off-on thermostatic control for an electrically heated means; to provide such a device for interrupting a primary heating circuit upon attaining a predetermined maximum temperature in a body being heated and thereafter controlling a secondary heating circuit to hold a predetermined minimum temperature in said body; to provide such a device having a simplified adjustment means for regulating operating temperature conditions according to plural adjustment scales; and to provide such a device having co-acting regulating means individually adjustable to independent scales of operating conditions for controlling the operation of a maximum-temperature circuit-interrupter according to the sum of the individual adjustments and including means for independently regulating a minimum temperature holding circuit.

Still further objects are to provide thermostatic stack-switch construction; to provide such a device having dual independent temperature control functions actuated by a single thermal-responsive means; to provide such a device having an improved regulating means for adjusting the temperatures to be controlled; and to provide a simplified thermostatic switch construction for two-heat temperature regulation of beverage brewing appliances.

Specific embodiments of this invention are shown in the accompanying drawings in which:

Fig. 6 is a side elevational view of the snap-acting switch blade employed in the switch devices shown in Figs. 1, 2 and 3;

Fig. 7 is a top plan view of the same;

Fig. 8 is a face view of the temperature scale plate for the switch device of Fig. 1;

Fig. 9 is a similar view of the scale plate for the device of Fig. 2;

Fig. 10 is a similar view of the scale plate for the switch of Fig. 3; and

Fig. 11 is a partially sectioned view illustrating the application of the improved switch construction to an automatic coffee making appliance.

Figure 1:
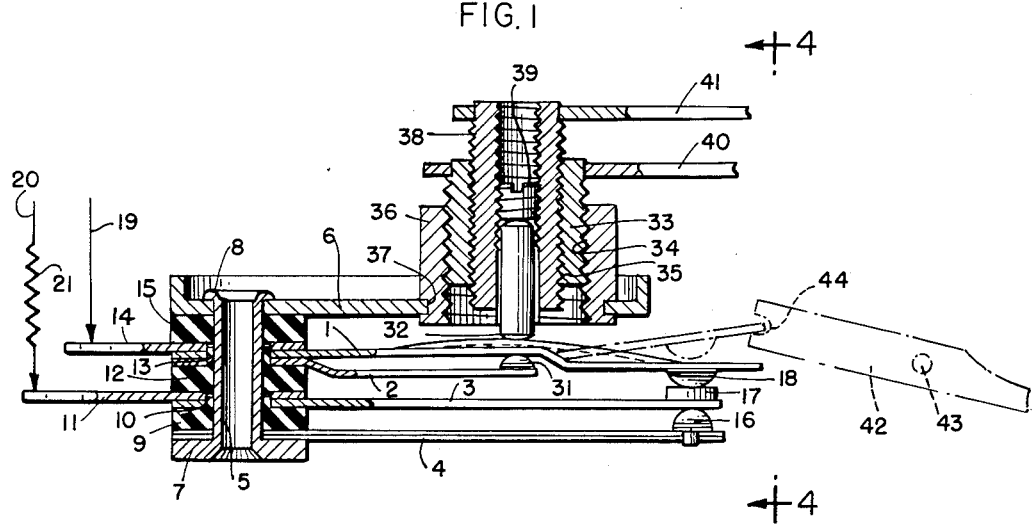
Fig. 1 is a sectional side elevation of the improved thermostatic switch assembly arranged for single-acting maximum-temperature control according to adjustment of dual regulating means adjustable to independent temperature scales.

In the forms shown in the drawings the improved thermostatic control device is particularly arranged and adapted for use in the regulation of automatic, electrically heated coffee makers wherein it is desired to have an adjustable control means responsive to several operating conditions for producing various combinations of selected end results. For example, in some coffee makers it is desired to brew automatically selective quantities of coffee with a selectively variable range of strength from light to dark; in others it may be desired to provide for selectively variable strength and at the same time provide adjustable automatic means for holding a constant temperature in the brew after the coffee making operation is completed; and in some devices it may be desired to provide automatic control means adjustable for both quantity and strength as well as a selected holding temperature. With these several variable conditions of operation in view, the problem has been that of providing a relatively simple control device of small size and with centralized adjustment means which would be adaptable to the constructions of present day automatic coffee brewer designs. The present invention is believed to fulfill all of the operational and size requirements and at the same time meet the need for low cost of manufacture so necessary in the highly competitive electrical appliance field.

As shown in Fig. 1, the improved switch construction is intended for single-acting, maximum-temperature shut-off regulation of a coffee brewer and is adjustable for selectively variable conditions of quantity and strength. This arrangement comprises a snap-acting switch blade 1, movable between two positions of rest shown by the solid and dotted outline, a fulcrum arm or bar 2 which provides a fixed point about which adjustment and snap action of the blade 1 takes place, a second switch blade 3, and a bimetal thermal-responsive actuating blade 4, all mounted in spaced, parallel, stacked relation on a single hollow mounting rivet 5 which, in turn, is secured to and projects from one end of a frame member 6 which overhangs the several stacked blades in parallel relation therewith.

The rivet 5 has an enlarged flat head 7 at its outer end and the opposite end is staked to the frame member 6, as at 8, in the usual manner. The bimetal blade 4 rests directly against the rivet head 7 and is followed by a spacer washer 9, of a suitable dielectric or electrical insulating material, which has an axial collar 10 projecting from its inner margin on the side opposite the blade 4. The blade 3 and a terminal bar 11 are then mounted on the collar 10, so as to be insulated from the rivet 5, and are immediately followed by a second dielectric spacer washer 12 which has a collar 13 like the washer 9. The bar 2 and blade 1, and a second terminal bar 14, in the order named, are then mounted on the collar 13; and finally a third insulating washer 15 is mounted on top of the terminal 14 to insulate the same from the frame member 6, and all of the elements are clamped securely between the rivet head 7 and the bottom side of the frame member by the staking of the rivet 5 thereto.

As shown in Fig. 1, the bimetal blade 4 is provided with a rounded spacer button 16 adjacent its free end for engagement with the free end of the switch blade 3 and the blade 3 is biased toward the blade 4 so as to always bear against the button 16 which is of a suitable dielectric material for electrical insulation purposes. The switch blade 3 carries a contact 17 adjacent its outer end, on the side opposite the button 16, which contact is engageable with a contact 18 mounted on the adjacent face of the switch blade 1. Thus, since the switch blades 1 and 3 are electrically insulated from each other, the engagement and disengagement of the contacts 17 and 18 with each other, under the influence of the bimetal blade 4, will close and open an electric heater circuit connected across the terminal bars 11 and 14. As shown in Fig. 1, the heater circuit is represented by the leads 19 and 20 and the resistance 21.

The construction of the snap-acting switch blade 1 is shown in detail in Figs. 6 and 7 wherein it will be seen that the blade is essentially an elongate stamping of a suitable resilient electrically conductive material in which a pair of parallel elongate slots 22 and 23 are punched to form three parallel arms 24, 25 and 26. These slots terminate short of each end of the blade to leave solid end portions 27 and 28 by which the blade arms are connected together and the rearward end portion is punched as at 29 to fit over the collar 13 of the spacer washer 12 for mounting the blade on the rivet 5. The forward end portion 27 of the blade carries the contact 18 on its under side, as shown in Fig. 6.

As shown, the outer arms 24 and 26 of the switch blade 1 are transversely upset, as at 30, at a point equidistant from one end of the blade, preferably nearer the forward end 27 so as to place the forward portion of the blade in a parallel but vertically downward offset relation with the rearward portion. This shortens the lateral arms 24 and 26, with respect to the central arm 25, and causes the central arm to bow upward or outwardly relative to the lateral arms so that the blade becomes a tensioned element in which the free end 27 will normally be held at one side or the other of the bowed central arm. The blade 1 thus becomes a snap-acting member, with a toggle-like action, and in its horizontal or circuit closing position, as shown in solid outline in Figs. 1 and 6, the contact carrying free end 27 is below the bowed arm 25, while in its open position the free end is above the bowed arm as shown by the dotted line position in Figs. 1 and 6.

Actuation of the switch blade 1 between its open and closed positions is had by the mechanical application of upward or downward movement, as the case may be, at the free end 27 of the blade, and in order to limit the extent of movement necessary to initiate the snap or toggle action, the central arm 25 is clamped between opposing fulcrum members 31 and 32 which are relatively fixed with respect to the blade 1. The lower fulcrum 31 is in the form of a boss or knob at the free end of the fulcrum arm 2, which is mounted immediately below the blade 1 and preferably engages the central blade arm 25 at a point adjacent and rearward of the upset points 30. The arm 2 is a relatively stiff resilient member and the fulcrums 31 and 32 serve to hold the central arm 25 of the switch blade in fixed position when upward or downward movement is imparted mechanically to the free blade end.

The upper fulcrum member 32 is disposed to bear downwardly on the top side of the blade arm 25, directly above the member 31, and is mounted so as to be vertically adjustable against the resiliency of the arm 2. Adjustment of the member 32 thus results in a shifting of the fulcrum point about which the blade 1 acts and it is by this means that the action of the switch blade 1, in response to upward movement of the blade 3 under the influence of the bimetal blade 4, may be controlled.

As before mentioned, the switch device shown in Fig. 1 is intended to be adjustable according to two selectively variable conditions and since only the one adjustable means 32 is provided for regulating the action of the switch blade 1, the means for setting each of the variable conditions must be correlated to produce a single result which, in effect, is the sum of the two variables. In the form shown in Fig. 1, this is accomplished by providing two differential screws, one within the other and both independently adjustable, along a common axis, relative to the frame member 6 of the switch assembly, for determining the vertical position of the fulcrum means 31—32. The first or outer screw 33 is a hollow open-ended member, provided with high speed or fast lead external thread 34 and a low speed or slow lead internal thread 35, rotatably mated in an internally threaded collar 36 which, in turn, is secured fast in a suitable opening 37 in the frame member 6 in axial alignment with the fulcrum member 32. The second or inner screw 38 is also an open-ended hollow member externally threaded and of a size to mate with the internal low speed thread of the screw 33 and is rotatably mounted therein for axial adjustment relative thereto. As shown, the hollow screw 38 is arranged to receive the fulcrum member 32 in endwise axially slidable relation, the member 33 being in the form of a short dowel with rounded ends and preferably made of a suitable ceramic or other dielectric material. As shown, the screw 38 is internally threaded to receive a set screw 39 which bears on the inner end of the member 32 for adjustably fixing its axial position relative to the screw 38 for calibrating purposes.

Each of the screws 33 and 38 is provided with an operating lever, 40 and 41 respectively, and preferably the mating threads of the screw 38 are formed with about one-half the pitch of the mating threads 34 and 35 of the screw 33 and the collar 36 and all the threads are of the same hand. Thus rotation of either of the screws 33 or 38, through the same angular distance, will produce the same extent of axial movement of the fulcrum member 32. The reason for this result is that while rotation of the screw 38, on its slow lead thread and relative to the screw 33, acts directly to move the fulcrum member 32 according to the axial screw travel, rotation of the screw 33 relative to the screw 38 and the collar 36 results in the screw 38 moving simultaneously in the opposite direction of the screw 33. Therefore, with the pitch of the outer thread 34 of the screw 33 being twice that of its inner thread, the net axial movement of the fulcrum member will be substantially the same upon turning either screw through the same angular distance.

In the process of brewing coffee, particularly in the percolator type of coffee makers, it is known that the minimum temperature that must be attained in the brew water will vary directly according to the conditions desired in the finished brew, i. e., light, medium or dark (weak, medium or strong), and according to the quantity being brewed, i. e., 2, 4, 6 or 8 cups; the temperature increasing as greater strength or quantity is desired. For example, in a typical percolator type of coffee maker, the minimum temperature condition required may be in accordance with the following chart wherein typical temperatures for the quality conditions of light, medium, and dark are shown, in degrees F., for various quantities to be brewed:

| Quantity | Light | Medium | Dark |
| --- | --- | --- | --- |
| 2 cups | 130 | 145 | 160 |
| 4 cups | 145 | 160 | 175 |
| 8 cups | 160 | 175 | 190 |

According to this chart, it will be seen that there is a 30° differential between the high and low temperatures for the quality range in each condition of quantity, as well as in the quantity range for each condition of quality; and that for any predetermined set condition of quantity or quality the temperature must be adjustable through a range of 30° to accommodate the variable condition. Thus a thermostatic switch operable according to the chart must have a total adjustment range of 60°, or from 130° to 190°, and in the construction of Fig. 1 that is accomplished by providing a thread on the screw 38 with a pitch calculated to move the screw a sufficient axial distance for 30° of temperature adjustment within the allowable range of angular movement of the control lever 41, and then assembling the regulating screws in the collar 36 so that they will be substantially in the middle of their respective ranges of axial movement when the control levers 40 and 41 are in position for mid-point registration on their respective operating scales. Final temperature calibration is effected by means of the internal set screw 39 in the usual manner.

Since the switch blade 1 is a snap-acting member requiring manual reset for thermostatic control operation, it will be understood that a suitable reset lever will be provided for returning the blade to its circuit closing position after it has performed its circuit breaking function. Such a lever is shown in dotted outline in Fig. 1, and as shown comprises a bar 42 pivoted between its ends at 43 and having a jaw 44 which operatively engages the free end of the switch blade 1. The bar 42 moves with the end of the blade 1 at all times and thus the position of the end of the bar, on the opposite side of the pivot 43, provides an indication of whether the switch blade is in "on" or "off" position.

A typical application of the improved switch in a percolator type of coffee brewer is shown in Fig. 11 wherein the switch is shown mounted against the bottom wall of the water container in an inverted position from that shown in Fig. 1 so that the head 7 of the mounting rivet 5 bears directly against the said bottom wall for the most efficient conduction of heat therefrom to the bimetal blade 4. In this arrangement the levers 40, 41 and 42 are positioned to project sideways relative to the several switch blades and extend through suitable slots or openings in the coffee brewer base where they are accessible for manipulation. A siutable scale plate for the several control levers is shown in Fig. 8 and it will there be seen that each lever has its own scale for adjustment so that operation for any condition of quantity and quality of the brew is simple and direct. The lever 40 is operable along slot 45 for any quality of strength between light and dark; the lever 41 is operable along slot 46 for any desired quantity; and the lever 42, operable in the opening 47, indicates whether or not the heater circuit is "on" or "off."

In the operation of the improved switch thus far described, and with particular reference to Fig. 1, automatic actuation of the switch mechanism is caused by upward movement of the bimetal blade 4, under the influence of heat affecting the blade by radiation or conduction through the rivet head 7, the button 16 pressing upwardly on the switch blade 3 and thence acting on the blade 1 through the closed contacts 17 and 18. As the temperature rises the movement of the bimetal blade 4 ultimately forces the free end of the switch blade 1 to the point where the direction of force from the bowed tension of arm 25 on the arms 24 and 26 changes so as to snap the blade to the dotted line position of Fig. 1 and thereby lift the contact end of the blade 1 beyond the reach of the contact 17 on the driven blade 3. This action opens the heater circuit and shifts the reset lever 42 to the "off" position. Since the snap action of the blade 1 occurs outwardly of the fulcrum 31—32 the amount of movement of the blades 4 and 3 necessary to produce the snap action depends upon the location of the fulcrum point vertically with reference to the blade 4 and hence thermostatic adjustment is had by shifting the fulcrum point up or down for higher or lower temperatures at which operation of the blade is desired. The fulcrum blade 2, being stiff and resilient, resistingly yields as the upper fulcrum member 32 moves downward and thereby maintains continuous pressure on the blade 1, and since the fulcrum 32 is positively positioned by the screws 33 and 38 adjustment of these screws up and down determines the temperature at which actuation of the switch blade 1 will occur.

In the foregoing description and in that to follow it will be understood that the terms "up" and "down," or "upwardly" and "downwardly," has reference to the switch devices positioned as shown in Figs. 1 to 7 inclusive. When installed in a coffee brewer the switches will probably be inverted, as shown in Fig. 11. Thus the lever 41, by which temperature adjustment for quantity is had, will be lowermost and the lever 42, by which adjustment for quality is had, will be the upper insofar as the adjustment scales of Figs. 8, 9 and 10 are concerned. The scales are shown as for right hand threads on the screws 33 and 38. Thus downward movement of the screws, as seen in Fig. 1, for decrease of temperature, is had by clockwise movement of the levers when viewed from the lever side of the switch assembly and this appears as movement from left to right on the scales as shown in Figs. 8, 9 and 10.

Figure 2:
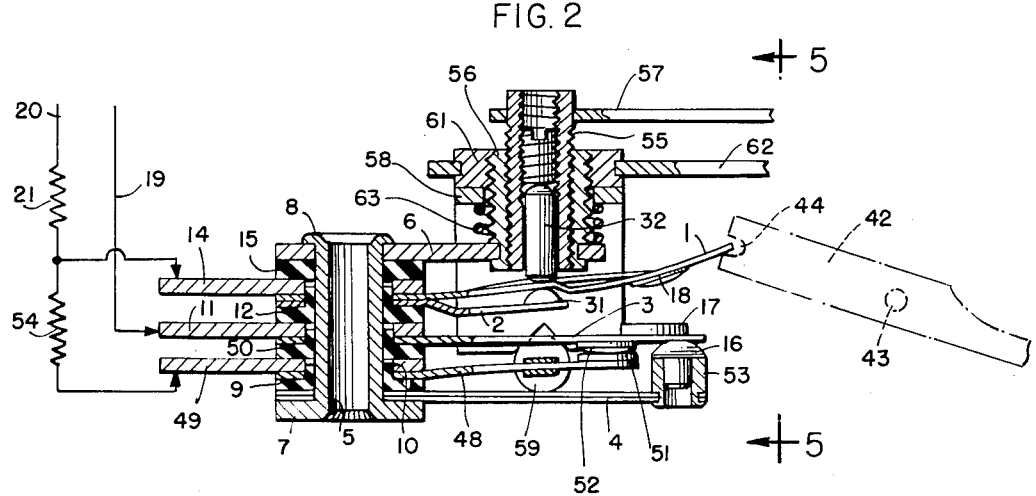
Fig. 2 is a similar view of the improved thermostatic switch arranged for single-acting maximum-temperature control and intermittent minimum or hold-heat regulation.
Figure 5:
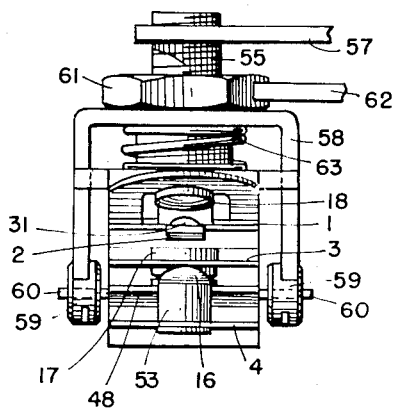
Fig. 5 is a similar view of the construction shown in Fig. 2.

The switch construction shown in Figs. 2 and 5 is a modification of the present invention which may be used in coffee brewing devices wherein no control for quantity is necessary, but where control of quality or strength is desired as well as provision for a holding heat to maintain a constant minimum temperature in the finished brew. This switch is very much like the construction of Fig. 1, except for the omitted quantity control means and except for the added "holding" heat control feature, therefore where like parts occur like reference numerals have been employed.

As shown in Figs. 2 and 5 the switch assembly includes an additional or third switch blade 48 and a terminal arm 49 therefor, interposed between the switch blade 3 and the bimetal blade 4 in the blade stack on the mounting rivet 5, which blade 48 and terminal 49 are spaced from the blade 3 by a dielectric washer 50. The blade 48 is shorter than the blades 3 and 4, so as to be operable between them, and carries a contact 51 on its upper side adjacent its free end for engagement with a contact 52 mounted on the underside of the switch blade 3. The button 16 on the bimetal arm 4 is mounted in a collar 53 to give it greater height for engaging the blade 3 and the blade 48 is biased in the upward direction so as to tend to keep its contact 51 in engagement with the contact 52 of the blade 3 at all times. Also, the connections of the leads 19 and 20 are reversed from the arrangement of Fig. 1 and are made to the terminals 11 and 14, respectively, so that the heater 21 will be connected to the terminal 14 for the snap-acting switch blade 1 and the blade 3 will be connected directly to the line 19. In this way the blade 3 may close a circuit through either of the blades 1 or 48, or both, and the thermostatic conditions for circuit controlling operation of each blade can be independently controlled.

The blade 48 functions to control a separate minimum temperature holding heater 54 which is connected between the terminal arm 49 and the heater 21, so as to be in series therewith insofar as the circuit through the terminal 49 is concerned. Thus, when the contacts 17 and 18, of the switch blades 3 and 1, are closed, the heater 54 will be shorted out and the heater 21 will function to its maximum capacity, whereas when the contacts 17 and 18 are opened and the contacts 51 and 52 remain closed the heaters 54 and 21 will be in series and the total capacity will be considerably less than that of the heater 21 alone but sufficient to hold an already heated body at a substantially constant minimum temperature.

As shown in Fig. 2, regulation of the actuating point for the circuit breaker blade 1 is had by means of a single hollow screw 55 which adjustably holds the upper fulcrum member 32 in the same manner as the screw 38 of the device of Fig. 1, and which is likewise externally threaded for engagement with an internally threaded member. In the present case the internally threaded member is a collar 56 directly mounted in a suitable opening in the frame member 6 in axial alignment with the fulcrum 32. The screw 55 is provided with an operating lever 57 and is thereby operable up and down to shift the fulcrum 32 and thus adjust the maximum temperature at which the switch blade 1 will act to open the circuit between its contact 18 and the contact 17 on the blade 3.

A separate and independent regulating means is provided, however, for control of the operation of the "holding" heater circuit switch blade 48, and as shown in Figs. 2 and 5, this means comprises a yoke 58 having a cross bar apertured to fit slidably over the collar 56 having depending legs, straddling the blade stack, adapted to engage endwise on bearings 59 which, in turn, are mounted on arms 60 extending laterally from each side of the blade 48. The collar 56 is externally threaded to receive a nutlike screw member 61, which in turn has an operating lever 62, and the nut is disposed above the cross bar of the yoke 58 for adjusting yoke axially of the collar 56 against a compression spring 63 surrounding the collar and bearing between the yoke cross arm and the frame member 6. Thus, by moving the yoke 58 up or down by means of the nut 61 and the operating lever 62 the movement of the arm 48, as it follows the switch arm 3 under the influence of the bimetal blade 4, can be limited so that at a predetermined point, or temperature, the contacts 51 and 52 will separate and thus open the hold-heater circuit. Ordinarily the range of adjustment of the yoke 58 for controlling the blade 48 will be about 20° F. or from 130° to 150° F.

In operation, the primary heating circuit is closed by operation of the reset lever 42 to snap the blade 1 to its contact engaging position. The heating then progresses until the water temperature has reached the point for the desired quality of the brew at which point movement of the bimetal blade will have pushed the blade 1 to its point of toggle action and the blade 1 will snap open. Thereafter the temperature of the brew will be wholly under the control of the switch blades 3 and 48 and the bimetal blade 4. Usually the brewing temperature will be higher than the desired minimum or holding temperature and the contacts 51 and 52 will be open when the principal heating circuit is interrupted. As the brew cools, however, the blade 4 will recede allowing the blade 3 to fall until its contact 52 engages the contact 51 on the blade 48 at which point the hold-heater circuit becomes energized. Thereafter a substantially constant temperature will be held in the brew under the control of the blade 4 which, by its action on the blade 3, will open and close the contacts 51—52 as the temperature rises and falls from the control point.

Figure 3:
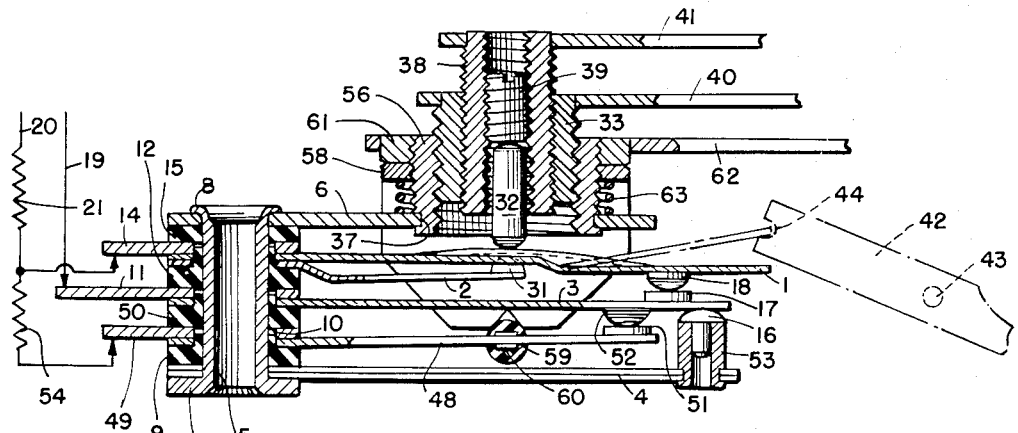
Fig. 3 is a similar view of an improved thermostatic switch combining the operating features of the devices shown in Figs. 1 and 2.
Figure 4:
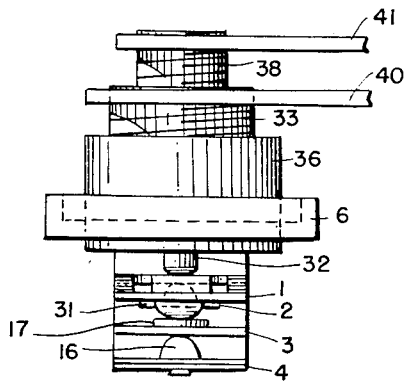
Fig. 4 is an end elevation of the construction shown in Fig. 1.

The switch construction shown in Fig. 3 embodies a combination of the features of the devices shown in Figs. 1 and 2. That is, it is like the device of Fig. 1 but with the added feature of a hold-heater circuit and the independent control means therefor whereby a predetermined minimum temperature can be maintained in the brew when the brewing process is completed. Thus, since the elements of this switch construction are identical with the corresponding elements of the devices of Figs. 1 and 2, the same reference numerals have been applied to Fig. 3 and further description is believed to be unnecessary as the operation of the device will be obvious from the explanation that has gone before. The view of Fig. 10 shows a typical scale plate that may be used with the device of Fig. 3 and is shown to illustrate the relation of the three temperature regulating levers that are employed.

The main advantages of this invention reside in the simple construction and arrangement of the thermostatically controlled switching elements and the adjusting means therefor whereby regulation to plural variable conditions is obtained; in the fact that the improved switch construction is readily applicable to any more or less standard coffee brewing devices; in the fact that the individual control levers provide for simple and readily understandable operation in setting the coffee maker for automatic operation to produce substantially any desired type of brew; and in the fact that the improved multiple control thermostatic switch construction can be readily manufactured at low cost by the usual mass production procedures for thermostatic switch devices.

Although several embodiments of this invention are herein shown and described, it will be understood that numerous details of the constructions shown may be altered or omitted without departing from the spirit of the invention as defined by the appended claims. For instance, it will be appreciated that if desired to have the spring loads balanced upon the bimetal, one set of spring supported contacts can be mounted upon one side of the bimetal member 4 and another set of contacts upon the other side spring supported with the tensions of the two spring supports disposed to oppose each other, thus minimizing "creep" in the bimetal member due to stress load.

What is claimed is:

1. A thermostatic switch assembly comprising first and second switch blades mounted by one end in parallel axially spaced relation on a common vertical axis, terminal means for each of said blades, means for electrically insulating said blades from each other, mutually engageable contacts on the adjacent faces of the free ends of said blades, stationary fulcrum means disposed to engage the first blade between the ends thereof in a direction parallel with said vertical axis, said first blade including toggle means for urging the free end thereof to a position either above or below said fulcrum in the direction of said axis, and thermally responsive means engaging the free end of said second blade and movable to shift the same toward and away from the first blade upon increase and decrease of the temperature affecting said means.

2. A thermostatic switch assembly comprising first and second switch blades mounted by one end in parallel axially spaced relation on a common vertical axis, terminal means for each of said blades, means for electrically insulating said blades from each other, mutually engageable contacts on the adjacent faces of the free ends of said blades, normally stationary fulcrum means disposed to engage the first blade between the ends thereof in a direction parallel with said vertical axis, said first blade including toggle means for urging the free end thereof to a position either above or below said fulcrum in the direction of said axis, means for shifting said fulcrum means in the direction of said axis, and thermally responsive means engaging the free end of said second blade and movable to shift the same toward and away from the first blade upon increase and decrease of the temperature affecting said means.

3. A thermostatic switch assembly comprising first and second switch blades mounted by one end in parallel axially spaced relation on a common vertical axis, terminal means for each of said blades, means for electrically insulating said blades from each other, mutually engageable contacts on the adjacent faces of the free ends of said blades, normally stationary fulcrum means disposed to engage the first blade between the ends thereof in a direction parallel with said vertical axis, said first blade including tension means for urging the free end thereof to a position either above or below said fulcrum in the direction of said axis, means for shifting said fulcrum means in the direction of said axis, and thermally responsive means engaging the free end of said second blade and movable to shift the same toward and away from the first blade in direct relation with increase and decrease in the temperature affecting said means.

4. A thermostatic switch assembly comprising first, second and third switch blades mounted by one end in parallel axially spaced relation on a common vertical axis, terminal means for each of said blades, means for electrically insulating said blades from each other, mutually engageable contacts on the adjacent faces of the free ends of said first and second blades and said second and third blades, stationary fulcrum means disposed to engage the first blade between the ends thereof in a direction parallel with said vertical axis, said first blade including tension means for urging the free end thereof to a position either above or below said fulcrum in the direction of said axis, and thermally responsive means engaging said second blade and movable to shift the free end of the same toward and away from the first blade and away from and toward said third blade upon increase and decrease in the temperature affecting said means.

5. A thermostatic switch assembly comprising first, second and third switch blades mounted by one end in parallel axially spaced relation on a common vertical axis, terminal means for each of said blades, means for electrically insulating said blades from each other, mutually engageable contacts on the adjacent faces of the free ends of said first and second blades and said second and third blades, normally stationary fulcrum means disposed to engage the first blade between the ends thereof in a direction parallel with said vertical axis, said first blade including tension means for urging the free end thereof to a position either above or below said fulcrum in the direction of said axis, means for shifting said fulcrum means up and down in the direction of said axis, manually operable means for positioning the free end of said first blade below said fulcrum, and thermally responsive means engaging the said second blade and movable to shift the free end of the same toward and away from the first blade and away from and toward said third blade upon increase and decrease in the temperature affecting said means.

6. A thermostatic switch assembly comprising first, second and third switch blades mounted by one end in parallel axially spaced relation on a common vertical axis, terminal means for each of said blades, means for electrically insulating said blades from each other, mutually engageable contacts on the adjacent faces of the free end portions of said first and second blades and said second and third blades, said third blade being biased toward said second blade, normally stationary fulcrum means disposed to engage the first blade between the ends thereof in a direction parallel with said vertical axis, said first blade including tension means for urging the free end thereof to a position either above or below said fulcrum in the direction of said axis, means for adjusting said fulcrum means up and down in the direction of said axis, means for adjustably limiting the movement of said third blade toward said second blade, manually operable means for positioning the free end of said first blade below said fulcrum, and thermally responsive means engaging the said second blade and movable to shift the free end of the same toward and away from the first blade upon increase and decrease in the temperature affecting said means.

7. A thermostatic switch assembly comprising first and second switch blades and a bimetal blade all cantilever mounted in the order named in parallel vertically spaced relation on a common mounting means which, in turn, is secured on a frame member having a portion extending in parallel face-to-face relation with said first blade, the axis of said mounting means being normal to said frame member portion, terminal means for said first and second blades, means for electrically insulating said first and second blades from each other and said frame member, mutually engageable contacts on the free ends of said first and second blades, normally stationary fulcrum means disposed to engage said first blade between the ends thereof in the direction parallel with the axis of said mounting means, said first blade including tension means for urging the free end thereof to a position either above or below said fulcrum in the direction of said axis, and dielectric means on said bimetal blade for engaging said second switch blade and moving the free end of the same toward and away from said first blade as the bimetal blade warps in response to changes in the body temperature thereof.

8. A thermostatic switch assembly comprising first, second and third switch blades mounted by one end in parallel axially spaced relation on a common vertical axis, terminal means for each of said blades, means for electrically insulating said blades from each other, mutually engageable contacts on the adjacent faces of the free end portions of said first and second blades and said second and third blades, said third blade being biased toward said second blade, normally stationary fulcrum means disposed to engage the first blade between the ends thereof in a direction parallel with said vertical axis, said first blade including tension means for urging the free end thereof to a position either above or below said fulcrum in the direction of said axis, means for adjusting said fulcrum means up and down in the direction of said axis, means for adjustably limiting the movement of said third blade toward said second blade, manually operable means for positioning the free end of said first blade below said fulcrum, and a bimetal blade mounted on said common axis in parallel axially spaced relation with said third blade and on the side thereof opposite said second blade, said bimetal blade extending endwise beyond said third blade and having dielectric means for engaging the adjacent face of the second blade adjacent its free end for moving the same toward and away from said first blade upon increase and decrease in the temperature affecting said bimetal blade.

9. A thermostatic switch assembly comprising first and second switch blades mounted by one end in parallel axially spaced relation on a common vertical axis extending from a support member which overhangs said first blade, terminal means for each of said blades, means for electrically insulating said blades from each other, mutually engageable contacts on the adjacent faces of the free ends of said blades, normally stationary fulcrum means disposed to engage the first blade between the ends thereof in a direction parallel with said vertical axis and adapted to hold said first blade in predetermined spaced relation with said second blade, thermally responsive means engaging said second blade and movable to shift the same toward and away from the first blade upon increase and decrease of the temperature affecting said means, and adjustment means comprising a pair of concentric elements mounted on said support member and individually shiftable along a vertical axis aligned with said fulcrum means, one of said elements having direct operating engagement with said fulcrum means for shifting the same in the direction of said vertical axis and varying the spaced relation between said first and second blades.

10. A thermostatic switch assembly comprising first and second switch blades mounted by one end in parallel axially spaced relation on a common vertical axis extending from a support member which overhangs said first blade, terminal means for each of said blades, means for electrically insulating said blades from each other, mutually engageable contacts on the adjacent faces of the free-end portions of said blades, normally stationary fulcrum means disposed to engage the first blade between the ends thereof in a direction parallel with said vertical axis and arranged to hold said first blade in predetermined spaced relation with said second blade, thermally responsive means engaging said second blade and movable to shift the same toward and away from the first blade upon increase and decrease of the temperature affecting said means, and adjustment means mounted on said support member and comprising a pair of concentric screws having mutual threaded engagement one within the other and being axially aligned with said fulcrum means, the outer of said screws having threaded engagement with said support member on a thread of different pitch than that of the inner screw and said inner screw having operative engagement with said fulcrum means for moving the same along the screw axis to vary the spaced relation of said first blade with said second blade, and means for turning each of said screws independently of the other.

11. A thermostatic switch assembly comprising first and second switch blades cantilever mounted in spaced parallel face-to-face relation on a common mounting means projecting from a frame member having a portion disposed in face-to-face relation with said first blade, means for electrically insulating said switch blades from each other and said frame member, mutually engageable contacts on the adjacent faces of said blades adjacent the free ends thereof, thermally responsive means for engaging said second blade to move the free end of the same toward and away from the first blade, and means for adjusting the spacing of the free end of the first blade relative to the second blade, the last-named means comprising a pair of concentric screws having mutual threaded engagement one within the other, the outer of said screws being externally threaded and mounted on said frame member in threaded engagement therewith on an axis substantially parallel with said mounting means, dielectric means on the inner screw having operative engagement with said first blade, and means for turning said inner and outer screws independently of each other, the external thread on said outer screw being of different pitch than that of the inner screw.

12. A thermostatic switch as defined in claim 11 wherein the external thread on the outer screw is of greater pitch than the thread on the inner screw.

13. A thermostatic switch as defined in claim 11 wherein the external thread on the outer screw has a pitch twice as large as the pitch of the thread on the inner screw.

14. A thermostatic switch assembly comprising first and second switch blades cantilever mounted in spaced parallel face-to-face relation on mounting means projecting from a frame member having a portion disposed in face-to-face relation with said first blade, said frame member portion having an opening therethrough axially parallel with said mounting means and a collar surrounding said opening, means for electrically insulating said switch blades from each other and said frame member, mutually engageable contacts on the adjacent faces of said blades adjacent the free ends thereof, thermally responsive means for engaging said second blade to move the free end of the same toward and away from the first blade, and means for adjusting the spacing of the free end of the first blade relative to the second blade, the last named means comprising a pair of concentric screws having mutual threaded engagement one within the other, the outer of said screws being externally threaded and mounted in said collar in threaded engagement therewith, dielectric means on the inner screw having operative engagement with said first blade, and means for turning said inner and outer screws independently of each other, the external thread on said outer screw being of greater pitch than that of the inner screw.

15. A thermostatic switch assembly comprising first, second and third switch blades cantilever mounted successively in spaced parallel face-to-face relation on mounting means projecting from a frame member having a portion disposed in face-to-face relation with said first blade, said frame member portion having an opening therethrough axially parallel with said mounting means and a collar surrounding said opening, means for electrically insulating said switch blades from each other and said frame member, mutually engageable contacts on the adjacent faces of said blades adjacent the free ends thereof, thermally responsive means for moving the free end of said second blade toward and away from the first and third blades alternatively, and means for adjusting the operating relation of the free ends of the first and third blades with respect to the second blade; the last-named means comprising a pair of concentric screw members having threaded engagement with said collar and adjustable axially thereof, one of said screw members being mounted internally of said collar and the other externally thereof, means axially shiftable on said collar through adjustment of the outer screw member for adjusting said third blade with respect to said second blade, means on the inner screw member for operatively engaging the first blade to adjust the same with respect to said second blade, and means for turning said screw members independently of each other.

16. A thermostatic switch assembly comprising first, second and third switch blades cantilever mounted successively in spaced parallel face-to-face relation on mounting means projecting from a frame member having a portion disposed in face-to-face relation with said first blade, said frame member portion having an opening therethrough axially parallel with said mounting means and a collar surrounding said opening, means for electrically insulating said switch blades from each other and said frame member, mutually engageable contacts on the adjacent faces of said blades adjacent the free ends thereof, thermally responsive means for moving the free end of said second blade toward and away from the first and third blades alternatively, and means for adjusting the operating relation of the free ends of the first and third blades with respect to the second blade; the last-named means comprising a pair of concentric screw members having threaded engagement with said collar and adjustable axially thereof, one of said screw members being mounted internally of said collar and the other externally thereof, a yoke member axially shiftable on said collar and having laterally spaced axially extending legs terminating adjacent the plane of said third blade, laterally projecting arms on said third blade engageable with the legs of said yoke, means for holding said yoke in operative engagement with the external screw member, means on the inner screw member for operatively engaging the first blade to adjust the same with respect to the second blade, and means for turning said screw members independently of each other.

17. In a thermostatic switch assembly comprising first, second and third blades cantilever mounted successively in spaced parallel face-to-face relation on mounting means projecting from a frame member having a portion disposed in face-to-face relation with said first blade, said frame member portion having an opening therethrough axially parallel with said mounting means and a collar surrounding said opening, means for electrically insulating said switch blades from each other and said frame member, mutually engageable contacts adjacent the free ends thereof, thermally responsive means for moving the free end of said second blade toward and away from the first and third blades alternatively, and means for adjusting the operating relation of the free ends of the first and third blades with respect to the second blade; the last-named means comprising a pair of inner and outer concentric screws mutually threaded together one within the other and mounted within said collar with the outer screw in threaded engagement therewith, the inner screw having a thread of lesser pitch than the thread between the outer screw and said collar and having means for operatively engaging said first blade, a nut member thereon for adjusting said third blade with respect to said second blade, and means for turning said inner and outer screws and said nut member independently of each other.

18. A thermostatic switch assembly comprising first, second and third switch blades cantilever mounted successively in spaced parallel face-to-face relation on mounting means projecting from a frame member having a portion disposed in face-to-face relation with said first blade, said frame member portion having an opening therethrough axially parallel with said mounting means and a collar surrounding said opening, means for electrically insulating said switch blades from each other and said frame member, mutually engageable contacts on the adjacent faces of said blades adjacent the free ends thereof, thermally responsive means for moving the free end of said second blade toward and away from the first and third blades alternatively, and means for adjusting the operating relation of the free ends of the first and third blades with respect to the second blade; the last named means comprising a pair of inner and outer concentric screws mutually threaded together one within the other and mounted within said collar with the outer screw in threaded engagement therewith, the inner screw having a thread of lesser pitch than the thread between the outer screw and said collar and having means for operatively engaging said first blade, a nut member mounted externally on said collar in threaded engagement therewith, a yoke member axially shiftable on said collar and having laterally spaced axially extending legs terminating adjacent the plane of said third blade, laterally projecting arms on said third blade engageable with the legs of said yoke member, means for holding said yoke member in operative engagement with said nut member, and means for turning said inner and outer screws and said nut member independently of each other.

References Cited in the file of this patent

UNITED STATES PATENTS

| | | |
|---|---|---|
| 2,321,338 | Ulanet | June 8, 1943 |
| 2,566,270 | Weiland | Aug. 28, 1951 |
| 2,651,707 | Jepson | Sept. 8, 1953 |
| 2,692,317 | Bletz | Oct. 19, 1954 |